US000001207H

United States Statutory Invention Registration [19]

[11] Reg. Number: H1207

Smith

[43] Published: Jul. 6, 1993

[54] CHROMIC ACID ANODIZATION OF TITANIUM

[75] Inventor: Blair A. Smith, South Windsor, Conn.

[73] Assignee: United Technologies Corporation, Hartford, Conn.

[21] Appl. No.: 652,407

[22] Filed: Feb. 7, 1991

Related U.S. Application Data

[63] Continuation of Ser. No. 409,228, Sep. 19, 1989, abandoned.

[51] Int. Cl.[5] ..... C25D 11/02

[52] U.S. Cl. ..... 205/50; 205/206; 205/208; 205/322

[58] Field of Search ..... 204/29, 32.1

[56] References Cited

U.S. PATENT DOCUMENTS

| | | | |
|---|---|---|---|
| 2,829,091 | 4/1958 | Missel | 204/32 |
| 3,025,225 | 3/1962 | Snyder et al. | 204/145 |
| 3,180,807 | 4/1965 | Quinn | 204/38 |
| 3,198,718 | 8/1965 | Quinn | 204/15 |
| 3,502,552 | 3/1970 | Mizushima et al. | 204/56 |
| 3,616,279 | 10/1971 | Kendall | 204/14 N |
| 3,959,091 | 5/1976 | Moji et al. | 424/792 |
| 3,989,876 | 11/1976 | Moji et al. | 428/472 |
| 4,545,876 | 10/1985 | McGivern, Jr. | 204/130 |

OTHER PUBLICATIONS

Metal Finishing Guidebook and Directory for 1975, Metals and Plastics Publications, Hackensack, N.J., pp. 67–75.

H. Silman et al, Protective and Decorative Coatings for Metals, Finishing Publications, Ltd., Teddington, Middlesex, England, 1978, pp. 115–123.

J. P. Wightman & Jean Ann Skiles; Analysis and Bonding of Chromic Acid Ti–6A1–4V Adherends with High Temperature Structural Adhesives; 33rd International SAMPE Symposium, Mar. 7–10, 1988.

M. Natan, J. D. Venables, K. R. Breen, Effect of Moisture on Adhesively Bonded Titanium Structures; 27th National SAMPE Symposium, May 4–6, 1982.

A. Mahoon, Improved Surface Pretreatments for Adhesive Bonding of Titanium Alloys; 27th National SAMPE Symposiuim, May 4–6, 1982.

M. C. Locke et al., Optimization of Chromic Acid–Fluoride Anodizing for Titanium Prebond Surface Treatment, 25th National SAMPE Symposium and Exhibition, May 6–8, 1980.

B. M. Ditchek et al, Bondability of Ti Adherends, 12th National SAMPE Technical Conference, Oct. 7–9, 1980.

*Primary Examiner*—Donald P. Walsh
*Assistant Examiner*—Ngoclan T. Mai

[57] ABSTRACT

The present invention discloses a method of forming an adhesion promoting oxide surface on titanium in which the titanium surface is first abraded and then anodized in hydrofluoric acid free chromic acid.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHROMIC ACID ANODIZATION OF TITANIUM

This invention was made with Government support under a contract awarded by the Department of the Air Force. The Government has certain rights in this invention.

This is a file wrapper continuation application of U.S. Ser. No. 07/409,228, filed Sep. 19, 1989, now abandoned.

DESCRIPTION

1. Technical Field

The present invention relates to the art of surface preparation, specifically to surface preparation of titanium.

2. Background Art

The ability to form strong, durable bonds between titanium parts and other materials is an important problem in industries using this exotic material. Much research has been performed in trying to optimize the performance of such bonds. The focus of such research has been on the surface preparation of the titanium metal. It has been found that the formation of an oxide layer on the titanium improves the bonding of the adhesive to the metal. Further, it has been discovered that the porosity of the oxide coating formed on the titanium is also very important and that the more porous the oxide layer, the better the bond.

The standard processing solutions comprise an alkaline conversion coating such as the Pasa Jell materials, or the acid phosphate-fluoride aqueous conversion coating solution, or the acid anodize solutions such as the chromic acid/fluoride. In each case, it was found that in order to improve the bond strength of the oxidized surface, a fluoride ion was required to be present in the processing solution. Although it is not clear exactly why this is necessary, it appears to improve the porosity of the oxide layer formed through the anodizing process and thereby afford a better surface for the adhesive to bond.

Unfortunately, fluoride ions and the materials which are used to generate these ions in the processing solutions are environmentally unsound and in certain instances, dangerous to the human operator. Therefore, what is needed in this art is an anodizing process for titanium which does not require the addition of halogen ions (in particular fluorine) to the anodizing solution, yet still result in high adhesive bond strengths.

DISCLOSURE OF INVENTION

Figure 1:
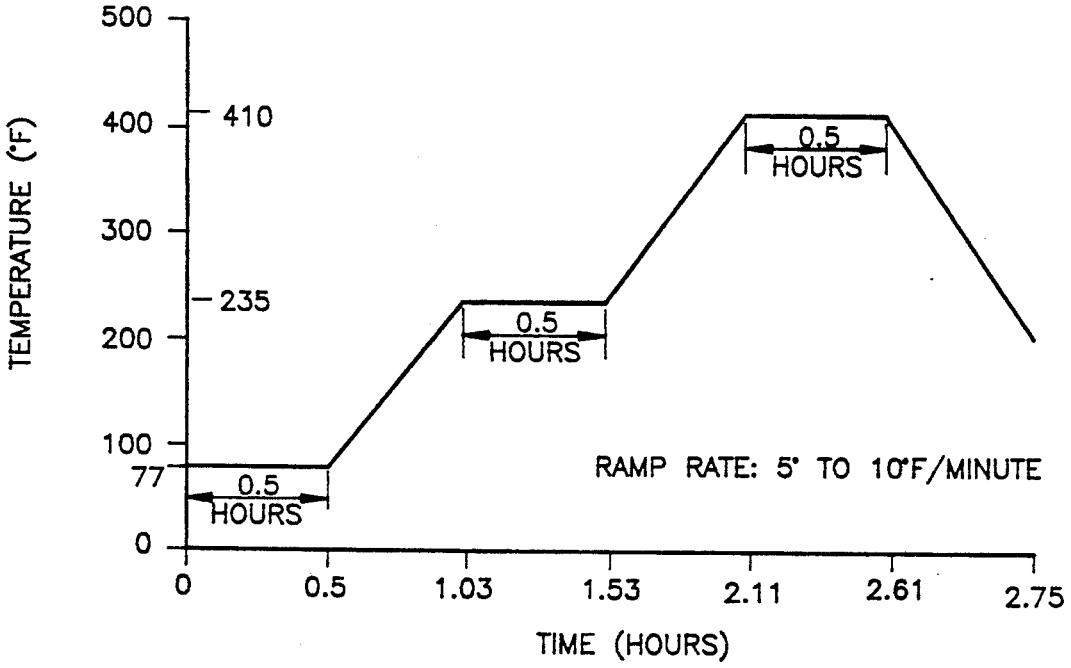
FIG. 1 is the cure cycle for the primer for preparing the specimens.

The present invention discloses a method for forming an improved oxide layer on titanium metal surfaces resulting in improved bondability of the titanium. The method comprises abrading the titanium surface to be bonded and then anodizing the abraded surface in a solution of chromic acid which is fluoride ion free.

Also disclosed is a titanium article having an oxide coating formed by the present invention on its surface.

The foregoing and other features and advantages of the present invention will become more apparent from the following description.

Best Mode for Carrying Out the Invention

The present method of preparing the surface of a titanium metal surface offers a halogen free process which results in adhesive bond strengths of overlap sheer, equivalent to those achieved by the more conventional flouride ion containing methods.

In the present method, the titanium surface which is to be bonded is first cleaned or degreased in a conventional manner. This may be performed by washing the surface with a degreaser such as methyl ethyl ketone, toluene, trichloroethyane or any other common degreaser. It should be noted that it is not recommended that chlorinated cleaning solutions be used if it is intended to expose the titanium part in an environment having temperatures in excess of 500° F. After the degreasing, the surface may then be further treated with an alkaline etch such as exposure to a hot aqueous solution of sodium hydroxide. Other conventional cleaning procedures which are used to prepare titanium for anodization with prior art processes may be used as well. Such procedures are well known to those skilled in the art and need not be set forth in detail here as they do not constitute part of the present invention.

Once the titanium surface has been prepared and dried, it is abraded using conventional abrasion techniques. By abraded, it is meant that the titanium surface to be bonded is exposed to a process which causes the surface to become uneven. This abrasive process, it is believed, increases the surface area of the titanium and removes the naturally occurring non-stoichiometric oxide layer so that a stoichiometric layer may be applied through anodization. Typically, the abraded surface is formed by conventional grit blasting techniques. The object is to remove all visible highlights present on the surface indicating that the surface is no longer smooth and has the requisite roughness to permit the anodic oxide to adhere satisfactorily to the surface.

The material used to abrade the titanium surface may be any conventional dry grit blast material such as alumina, silica, glass beads, silicon carbide or mixtures thereof with alumina being preferred. The particular size of the abrading material is not critical, however, it is believed that the preferred particular sizes range from about 45 microns to about 425 microns. Further, it is believed that the smaller the particle size the better the surface preparation and the better the adhesive bond. The most preferred sizes are about 45 microns to about 100 microns (these sizes are roughly equivalent to the Tyler mesh series of 80 to 300 mesh. This series may be used as a convenient method of measuring particle sizes). The optimum being about 75 microns to about 90 microns (180 mesh to about 220 mesh of the Tyler series). The pressure at which the abrasion process taken place and the nozzle size through which the abrading material is directed will naturally vary depending on the abrading material selected and the size of the particles. However, the proper selection of these parameters would be a matter of simple experimentation to determine the required force necessary to remove the highlights from the titanium surface. Typically, using the preferred particle sizes, satisfactory results may be achieved using a pressure of about 35 psig to about 45 psig and maintaining the nozzle distance about 0.5 inches to about 4 inches from the surface to be abraded.

After the titanium surface has been abraded, the excess abrasion material or residue of the abrasion process is removed by blowing off the residue with dry, oil free gas such as nitrogen.

Once the titanium surface has been abraded and cleaned, it is now ready to be anodized. The anodization process takes place in an aqueous solution of chromic acid to which no fluoride ions have been added. The solution contains from about 40 to about 60 grams per liter chromic acid (H2CrO4) and should be prepared using deionized water for best results. The preferred concentration of chronic acid is about 48 to about 52 grams per liter. The temperature of the anodize solution is typically at room temperature which is between about 60° F. to about 85° F. Although the bath may be operated at higher temperatures, it is preferred that it be below 90° F. The unique feature of this anodizing solution over those proposed by the prior art for anodizing titanium is that no fluoride ions, and in particular no fluoride ions, are added to the chromic acid solution. It is substantially flouride ion free. (By this it is meant that only fluoride ions inherently present in the chromic acid, if any, are present in the bath and no additional fluoride ions are added.)

The titanium surface is immersed into the anodize solution and using conventional anodization procedures, the voltage is increased to between about 12 volts to about 18 volts with a preferred range being between 14 and 16 with the most preferred being about 15 volts. (All of these volts being obtained versus a titanium or titanium alloy cathode.) For best results, it has been found that the voltage should be increased gradually until the desired voltage is reached. This rate will vary depending on the particular anodizing set-up but as a general rule increases at rates of about 5 volts/min. to about 30 volts/min. are preferred with the most preferred being about 10 volts/min. to about 20 volts/min., while the best rate is about 14 volts/min. to about 16 volts/min. The anodizing process continues until the voltage and current are stable and the titanium surface has turned a blue or grey-blue color. This means that the oxide surface has been formed.

After the anodizing process has been completed, the titanium article is removed from the anodizing tank and rinsed off. Typically, this is done by flowing cold water (below 85° F.) over the anodized surface to remove the residual anodize solution. A further cleansing is preferred, this time with warm water (about 100° F.). However, other procedures for removing the residual chromic acid may be used and the temperatures are not critical.

The titanium surface is then dried, preferably with a flow of dry gas (nitrogen).

The oxidized titanium surface is ready for priming and bonding. The primers and adhesives used to bond the titanium are conventional in nature and the selection of the particular one depends on the environment to which the bond will be exposed and the substrate to which the titanium will be bonded. The adhesives may be either organic or inorganic and may include expoxies, phenolics, polyamides, polyimides, polyesters, silicones, polysulfides, etc.

The primers which are typically applied to the titanium anodized surface again are conventional and will depend on the type of adhesive used. However, the preferred binder is a polyamide or a polimide such as BR-35, PMR-15, BR-127, (American Cyanimide, Havre de Grace, Md.). The primer is applied in a conventional manner and at conventional thicknesses over the anodized titanium surface. It has been found that for best results it is best to prime the surface within four (4) hours from removal from the anodization tank. If priming is not going to be performed within this time, it is recommended that it be placed in a desiccator. Once the titanium has been primed, the adhesive may be applied and the part bonded to the second component to which it is to adhere using conventional techniques i.e. pressure, heat. This second component may be another piece of metal such as titanium or steel or it could be an organic part such as a composite article formed of fiber reinforced material having an organic matrix. The matrices may include ceramic, epoxy, urethane, etc., naturally.

EXAMPLE

A series of five (5) test specimens were prepared to demonstrate the comparative lap shear strengths for the present process and processes using hydrofluoric acid in the anodize solution. Additionally, a comparison was made between the panels having been abraded and those having been prepared using a conventional etch prior to anodization.

The titanium panels were prepared as follows:

All of the panels were degreased using methyl ethyl ketone in a conventional manner and then dried.

The panels were then immersed in a cleaning solution of Metex T 103 (available from the MacDermid Inc., Waterbury, Conn.). The solution comprised 8 to 10 ounces of Metex T 103 per gallon of deionized water. The panels were immersed in this solution at a temperature of 160° to 180° F. for about 10 to about 15 minutes. The panels were then rinsed with tap water the temperature of which was 100° F. or higher, and blown dry with oil free nitrogen. Three of the panels were then grit blasted. Samples 1 and 2 were grit blasted with 180 to 220 mesh alumina ($Al_2O_3$) (=75 microns to about 90 microns) at 40 to 60 psig at a distance from the nozzle of 2 inches. The abraded surface of the panels were then exposed to a stream of oil free nitrogen gas to remove residual abrasion material. Panel 3 was abraded using a grit of silica ($SiO_2$) having a grit size of 80 (180 micron average). The distance from the nozzle to the panel surface was again 2 inches. This panel was also exposed to a stream of oil free nitrogen gases. Panel 2 was then anodized using a chromic acid bath comprising 50 grams per liter (g/l) in deionized water at an anodize voltage of 15 volts versus titanium cathode, for 20 minutes. The voltage having been raised at the rate of 15 volts/minute. The bath temperature being 70° F.

Panels 1 and 3 were anodized using a chromic acid bath containing a solution of 50 g/l of chromic acid in deionized water and 0.1 milliliters per liter (ml/l) of 48% hydrofluoric acid (which was sufficient HF to maintain the current density of the bath at 1-3 amps per square foot). The anodized panels were then rinsed under flowing cold water (70° F.) for about 60 seconds and then under flowing hot water (105° F.) for about 60 seconds. The panels were than blown dry with oil free, dry nitrogen.

Panels 4 and 5 were not grit blasted after the Metex cleaner step but were instead etched using a solution of 5.8 volume % of 48% hydrofluoric acid and 40 vol % nitric acid in distilled water.

Then panel 4 was anodized in the same manner as panel 2 and panel 5 was anodized as were panels 1 and 3.

Figure 2:
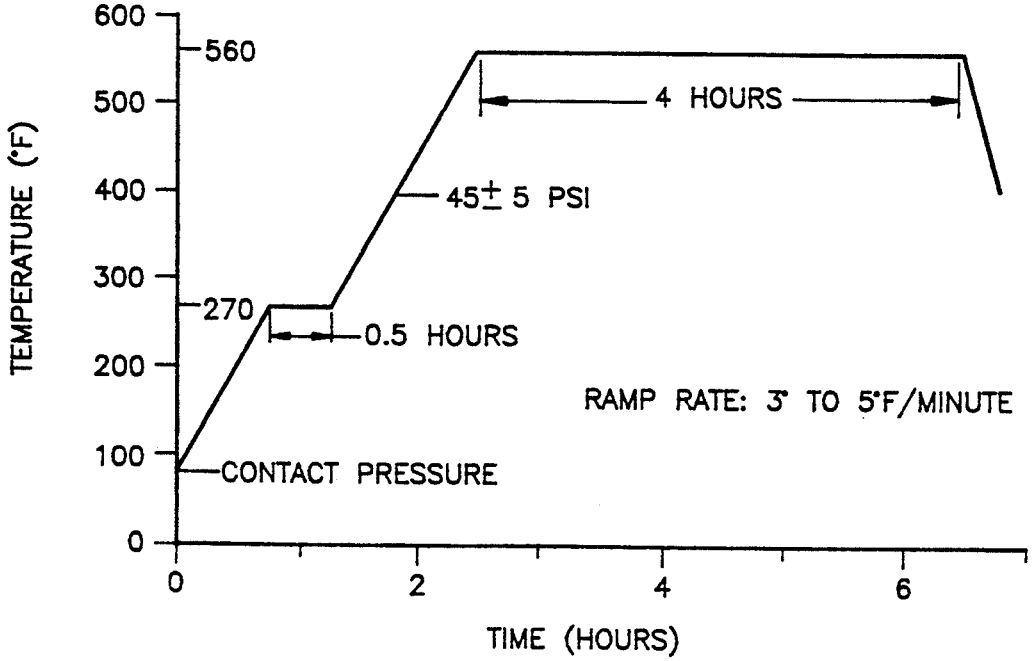
FIG. 2 is the cure cycle for the adhesive in preparing the specimens.

Five overlap shear specimens were then prepared from each of the panels. In preparing the specimens the surface of each of the panels was primed using a primer identified as BR-35 (available from American Cyanimide Co. Havre de Grace, Md.) which is a polyimide. The primer was then cured using the cure cycle shown in FIG. 1. The primed panels were then bonded using an adhesive FM-35 (available from American Cyanimide, Co.) which is an aluminum filled polyimide. The adhesive film was 11 mils thick and was cured under heat and pressure using the cure cycle shown in FIG. 2.

As may be seen from the table, their is no change in the overlap shear strengths with or without the presence of hydrofluoric acid in the anodize solution. Additionally, samples 4 and 5 demonstrate the contribution abrasion makes to the elimination of the hydroflouric acid.

TABLE

| SAMPLE | AVERAGE OVERLAP SHEAR STRENGTH FOR 5 SPECIMENS psi |
|---|---|
| 1 | 2249.1 |
| 2 | 2624.7 |
| 3 | 2681.9 |
| 4 | 1809.2 |
| 5 | 1518.6 |

In addition, samples were prepared in which the titanium panels were bonded to a fiber reinforced resin matrix composite laminate. The results of these samples showed the same relative bond strengths between those samples having been prepared with hydrofluoric acid and those having been prepared with the present method. Although the absolute bond strengths of the composite samples was lower than those of the titanium to titanium samples.

In conclusion, it appears that the surface preparation for titanium components which are to be adhesively bonded may eliminate the use of hydrofluoric acid if the surface of the titanium is first abraded prior to anodization. There is no loss of overlap shear strengths when such a substitution is made and offers a less dangerous, more environmentally sound process.

Although this invention has been shown and described with respect to detailed embodiments thereof, it will be understood by those skilled in the art that various changes in form and detail thereof may be made without departing from the spirit and scope of the invention.

I claim:

1. A method of forming an adhesion promoting oxide surface coating on a titanium metal surface comprising:
abrading the titanium surface, and anodizing said abraded titanium surface in an aqueous solution of substantially fluoride ion free chromic acid.

2. The method of claim 1 wherein the titanium metal surface has been mechanically abraded.

3. The method of claim 2 wherein the mechanical abrasion is performed by grit blasting.

4. The method of claim 3 wherein the grit blast is either alumina, silica, glass beads or silicon carbide or a mixture thereof.

5. The method of claim wherein the chromic acid solution contains about 4 percent by weight to about 6 percent by weight chromic acid.

6. The method of claim 1 wherein the anodizing process is performed at a potential of about 12 volts to about 18 volts.

7. A titanium article having an oxide coating formed by the process of claims 1, 2, 3, 4, 5 or 6.

* * * * *